C. B. & J. M. BECK.
ELECTRICAL TESTING STANDARD.
APPLICATION FILED FEB. 8, 191
1,166,426.
Patented Jan. 4, 1916.
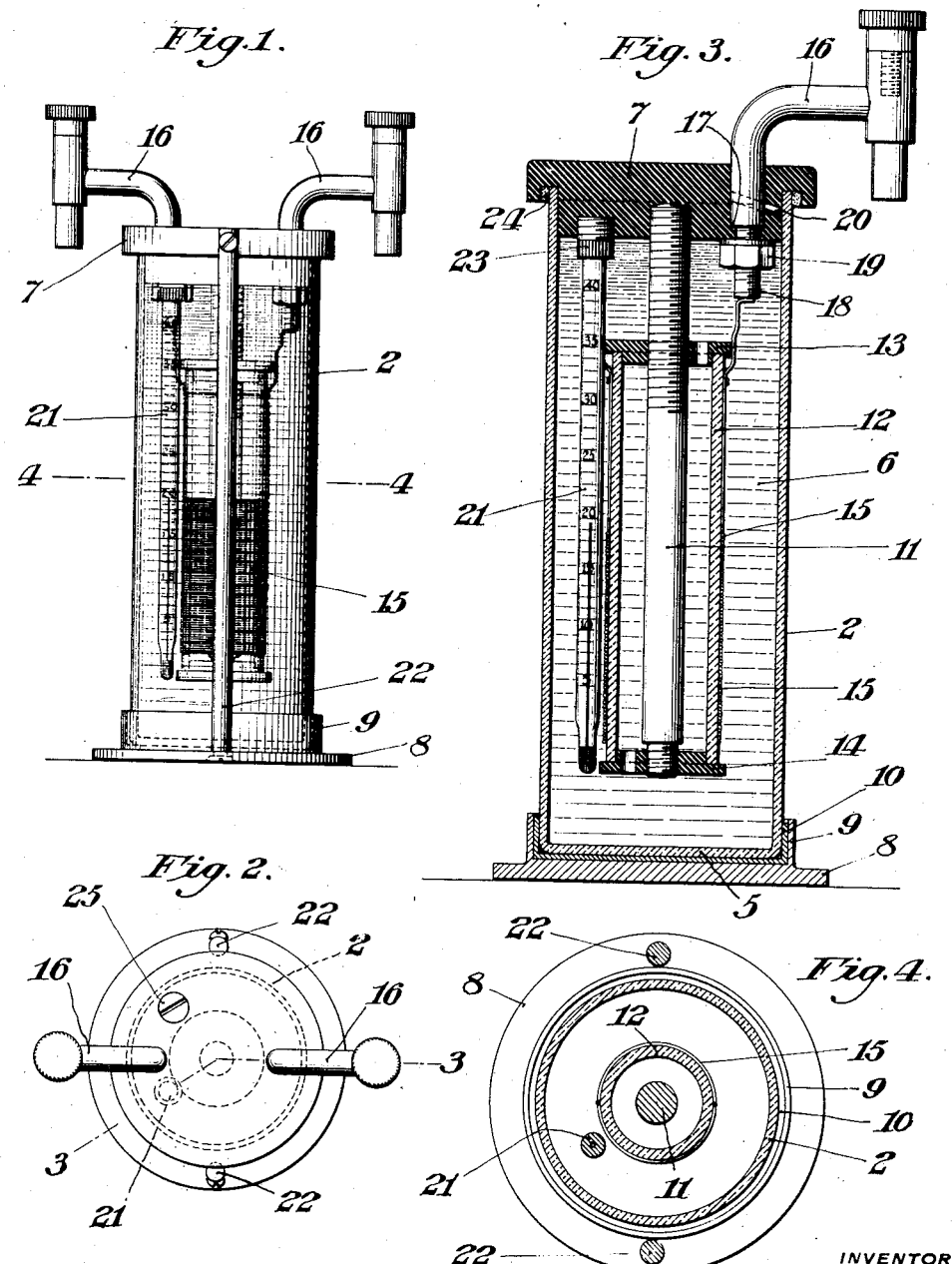
WITNESSES
R. Schleicher
G. P. Sharkey.
INVENTORS
Charles B. Beck
and Joseph M. Beck.
BY 
ATTORNEY

UNITED STATES PATENT OFFICE.

CHARLES B. BECK AND JOSEPH M. BECK, OF PHILADELPHIA, PENNSYLVANIA.

ELECTRICAL TESTING-STANDARD.

1,166,426.  Specification of Letters Patent.  Patented Jan. 4, 1916.

Application filed February 8, 1912. Serial No. 676,372.

*To all whom it may concern:*

Be it known that we, CHARLES B. BECK and JOSEPH M. BECK, citizens of the United States, residing in the city and county of Philadelphia and State of Pennsylvania, have invented certain new and useful Improvements in Electrical Testing - Standards, of which the following is a specification.

Our invention relates to resistance standards used in connection with Wheatstone bridges, potentiometers and other resistance apparatus in which precision is required.

The most approved type of resistance standards of the class to which our invention relates have heretofore included in their construction a sealed casing in which the coil was immersed in oil and in which the coil surrounded a central tube open at its top and containing no oil for the reception of a thermometer which was inserted into the tube, and, after remaining therein sufficiently long to take the temperature of the coil, was removed from the tube and read. In some instances the thermometer extended beyond the open end of the tube and the projecting end was read some distance from the coil without removing the thermometer from the tube. It has been found difficult in this type of resistance standard to obtain the temperature of the coil very accurately for the reason that it has been necessary to make stem corrections of the thermometer, as is well known, and for the further reason that it is difficult to compensate for the temperature lag between the coil and the thermometer such lag being occasioned by the parts intervening between the coil and the thermometer.

The object of our invention is to provide a resistance standard of novel, simple and efficient construction in which the difficulty just mentioned is obviated, and by means of which the temperature of the coil may be taken more accurately than has been possible prior to our invention.

We accomplish our object by the provision of a resistance standard construction in which the thermometer is immersed in oil with the resistance coil in close proximity thereto, in which only the oil and the usual shellac coating of the coil is all that intervenes between the actual coil and the thermometer, and in which the thermometer remains at all times in the temperature taking position in which it may be read at all times by being seen through a transparent part of the casing inclosing it in oil with the coil.

The invention includes various novel features of construction and combinations of parts hereinafter fully described and particularly claimed.

In the accompanying drawings illustrating our invention: Figure 1, is an elevation of our improved resistance standard. Fig. 2, is a plan view thereof. Fig. 3, is a vertical section, on line 3—3 of Fig. 2. Fig. 4, is a horizontal section, on line 4—4 of Fig. 1.

Referring to the drawings, 2 designates a vertically-arranged cylinder or casing formed of suitable transparent material, preferably glass. The cylinder 2 has an integral bottom 5 closing the lower end thereof, and the cylinder and its bottom form and inclose a chamber 6 adapted to receive and contain oil. The top of the cylinder or casing 2 is closed and sealed by a cap or cover of insulating material 7 having a part fitted to and extending into the upper portion of the cylinder and a part extending over and engaged with the top of the cylinder and extending down the outside of the cylinder, forming an annular groove which is filled with suitable material such as an insoluble wax 24 to form a tight joint. Suitable sealing material or composition is also interposed between the upper end and the inner portion of the cylinder 2 and the cap 7 to insure a tight joint. The bottom of the cylinder 2 is provided with a suitable base 8 having an upwardly-extending, annular flange 9 within which the lower end of the cylinder is seated. A layer of cork or other cushioning material 10 is interposed between the base 8 and the cylinder 2 and its bottom 5 to protect the glass casing. The cap 7 is connected to the base exteriorly of the chamber 6, by vertical rods 22, to securely hold the parts together.

Within the chamber 6 is the support for the resistance coil; and, in the present embodiment of our invention, this support comprises a central rod 11, a tube 12 surrounding the rod in spaced relation thereto, a head 13 screwed on to the rod 11 and supporting the upper end of the tube 12, and a head 14 screwed on to the rod 11 and supporting the lower end of the tube 12. The upper end of the rod 11 is connected to the cap 7 by being screwed into but not through the cap, the cap covering the upper end of the rod and wholly sealing it within the chamber 6. The resistance coil 15 is wound upon the tub 12, and the ends of the coil are extended upwardly and suitably connected to the inner ends of terminal parts or leads 16 which extend through the cap 7 from the interior to the exterior of the chamber 6. The outer ends of the terminal parts 16 are constructed in the usual manner to be connected to wires or inserted into mercury cups in making the desired connections to the coil 15.

To make a tight joint between the terminal parts 16 and the cap 7, we reduce the inner or lower end 18 of each terminal 16, forming a shoulder 17 engaging a shouldered part of the cap 7, as shown. The reduced end 18 of each terminal is screw-threaded for the reception of a nut 19 which engages a washer and forces it against the bottom of the cap 7, thereby forcing the shoulder 17 into close contact with the cap 7. Before being inserted into the cap 7, the part of each terminal to be engaged with the cap is coated with a suitable sealing material or composition to insure a tight joint. To prevent the terminals 16 from turning we provide each with a stop pin 20 which extends through a part of the cap 7 and into an opening in the terminal, as shown in Fig. 3.

Arranged in the space between the outside of the coil 15 and the inside of the cylinder 2 and in close proximity to the coil is a thermometer 21, the upper end of which is connected to a head 23 which is screwed into but not through the cap 7 in a manner to support the thermometer, as shown. The thermometer 21 is of the well known type for taking the temperature of resistance coils and it may be readily seen and read through the transparent cylinder 2. In carrying out our invention it is not necessary that the entire vertical wall or cylinder 2 be made transparent but only enough thereof to permit the thermometer to be seen; the remaining part may be constructed as desired.

The coil 15 is, as usual, formed of manganin wire and it is coated with shellac in the usual manner. The coil 15 is also immersed or submerged in a suitable oil, preferably pure, high-grade petroleum oil which fills or substantially fills the chamber 6. The heads 13 and 14 of the coil support are perforated to permit the oil to freely enter and fill the space between the rod 11 and tube 12.

The oil, free from moisture, is introduced to the chamber 6 through a suitable opening in the cap 7, the opening being afterward closed by a screw 25 between which and the cap 7 is interposed shellac or other suitable sealing material to form a tight joint. Thus the oil and the coil are sealed within the chamber 6 and are therein protected from atmospheric humidity for the usual well known reasons.

By the construction shown in the drawings and described in the foregoing specification a resistance standard is provided which accomplishes the object of our invention as hereinbefore set forth.

We claim:

1. In a resistance standard, the combination of a sealed casing forming an oil chamber, a resistance coil within said chamber and having terminal parts leading to the exterior of the chamber, a thermometer within said chamber, and means to permanently support said coil and said thermometer within said chamber and adjacent to each other, said coil and said thermometer being immersed in oil within said chamber, and said casing having a transparent wall exposing said thermometer to view.

2. In a resistance standard the combination of a transparent casing having a closed bottom and forming an oil chamber, a cap sealing the top of said casing, a support fixed to said cap and projecting therefrom into said chamber, a resistance coil within said chamber and carried by said support and having terminal parts leading through said cap to the exterior of said chamber, and a thermometer fixed to said cap and projecting therefrom into said chamber adjacent to said coil, said coil and said thermometer being immersed in oil within said chamber, and said thermometer being exposed to view through the transparent wall of said casing.

3. In a resistance standard, the combination of a sealed casing forming an oil chamber, a tube sealed within said chamber and having its interior communicating with the chamber, and a resistance coil surrounding and supported by said tube and immersed in oil within said chamber and having terminal parts leading to the exterior of said chamber.

4. The combination of a casing forming an oil chamber, a cap closing the top of said casing, a rod projecting from said cap and into said chamber, a tube supported by and surrounding said rod in spaced relation thereto and having the interior thereof in communication with said chamber, and a resistance coil surrounding and supported by said tube and immersed in oil within said chamber and having terminal parts leading through said cap to the exterior of said chamber.

5. In a resistance standard the combination of a casing forming an oil chamber, a sealing cap therefor, a terminal part extending through said cap and having a shoulder formed thereon within the body of the cap, and a nut screwed on to the terminal part and clamping a part of the cap between said shoulder and said nut.

6. In a resistance standard the combination of a casing forming an oil chamber, a sealing cap therefor, a terminal part extending through said cap, and a pin extending through a part of said cap and into said terminal part and preventing turning thereof.

In testimony whereof we affix our signatures in the presence of two witnesses.

CHARLES B. BECK.
JOSEPH M. BECK.

Witnesses:
JESSE G. MYERS,
ALBERT H. BECK.